SAM H. JOHNSON, JR.
JACK C. VANDER WOUDE
INVENTORS

BY

ATTORNEY AND AGENT

United States Patent Office 3,501,537
Patented Mar. 17, 1970

3,501,537
PROCESS FOR SEPARATING HIGH-BOILERS OF THE OXO PROCESS
Sam H. Johnson, Jr. and Jack C. Vander Woude, Longview, Tex., assignors to Eastman Kodak Company, Rochester, N.Y., a corporation of New Jersey
Filed Apr. 1, 1964, Ser. No. 356,494
Int. Cl. C07c 27/26, 27/28, 29/16
U.S. Cl. 260—643    8 Claims

ABSTRACT OF THE DISCLOSURE

High-boiling by-products Oxo process are recovered as useful products by a particular process comprising distillation of the high-boiling still bottoms from the aldehyde splitter to obtain an overhead distillate which is hydrogenated and subsequently purified and separated into desired product streams.

---

Figure 1:
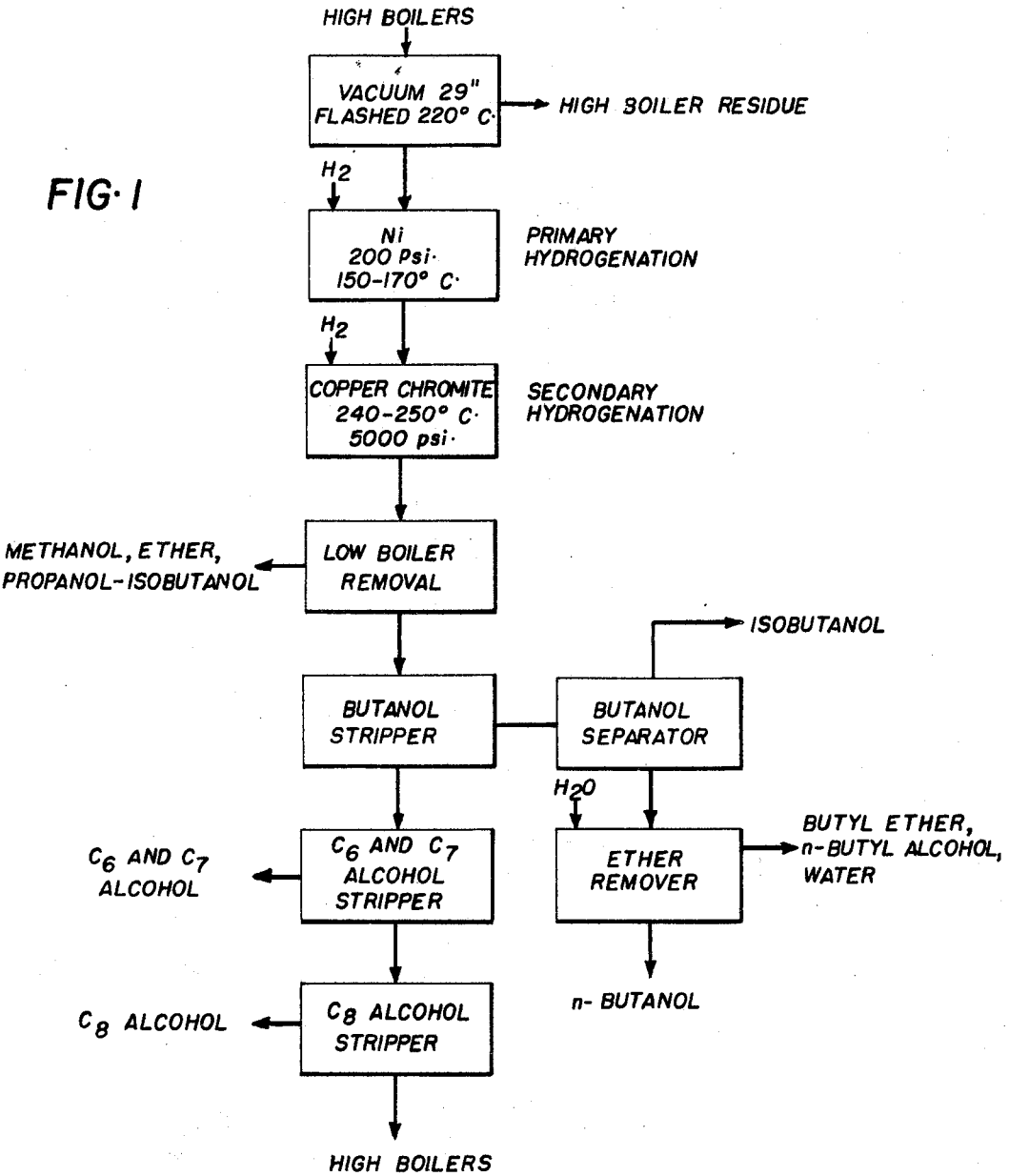

This invention relates to the so-called Oxo process for the production of aldehydes and alcohols and more particularly to a process for the utilization of high-boiling by-products of the Oxo process.

In the Oxo process, aldehydes are formed by reaction under pressure, of olefins with carbon monoxide and hydrogen employing a solution or suspension of a cobalt catalyst in a suitable reaction vehicle. The reaction has been called the hydroformylation reaction since it involves the addition of a hydrogen atom and a formyl group to the double bond of an olefin compound in the presence of a cobalt-containing hydroformylation catalyst.

The hydroformylation reaction with olefins, such as $C_2$–$C_6$ olefins, produces, in addition to aldehydes, many high-boiling by-products. Some of the products are alcohols, esters, ketones, acetals, ethers, and products arising from the aldol reaction. Under the best operating conditions the high-boilers may comprise from 5–20 percent of the products. This invention concerns itself with the treatment of these so-called high-boilers and their ultimate separation into useful products.

We have discovered that the hydrogenation of the by-product stream containing the high-boilers by a particular method permits effective separation of the resulting products. When propylene is used in the hydroformylation process, the following components have been identified as being in the high-boiling stream: diisobutyl ether, di-n-butyl ether, n-butyl-isobutyl ether, isobutyl alcohol, n-butyl alcohol, diisopropyl ketone, n-propyl ketone, n-propyl-isopropyl ketone, 2-ethylhexanal, 2-ethylisohexanal, 2-ethylhexanol, 2-ethylisohexanol and numerous esters. The boiling points and azeotropic boiling points prevent separation of these compounds by simple distillation. Similar oxygenated products are present in the high boiling by-product when other $C_2$–$C_6$ olefins are used in the Oxo process. Thus by the conversion of these compounds into their respective alcohols, it is possible to effect good separation into useful products. In addition to the pure compounds obtained in this fashion, the higher boiling residue is a hydroxy-containing mixture which may be used as a plasticizer, flotation agent, or as a solvent.

According to our invention, the Oxo process is carried out with an olefin, for example, propylene or a mixture of propylene and ethylene in the feed, after which the product stream is distilled for the removal of the main aldehydic product leaving a high-boiling still bottoms with which our invention is concerned containing traces of catalyst and oxygenated materials such as diisobutyl ether, 2-ethylhexanal, etc, mentioned above. The high-boiling Oxo still bottoms is first distilled, for example, by vacuum, steam or gas stripping methods to remove traces of cobalt catalyst and other by-products which would seriously interfere with the subsequent hydrogenation and separation of the components of the high-boiling bottoms. The distillate obtained which may include 80 to 95 percent of the distilland is then hydrogenated and the resulting product separated in the manner described in more detail below.

The process of our invention is not to be confused with known Oxo processes designed primarily for the production of alcohols in which directly following the hydroformylation reaction, without removal of the aldehydes, the product is hydrogenated to produce alcohols. As pointed out above in our process the main aldehydic product is first distilled and the resulting bottoms are then distilled so as to remove traces of cobalt catalyst and the resulting distillate containing higher alcohols, aldehydes and ethers, etc., is then hydrogenated to facilitate separation of the components. As a result, the products of the Oxo reaction are more efficiently separated and in particular more effective use is made of the hydrogenation catalyst.

The hydrogenation of the distillate from the Oxo still bottoms can be carried out in a single step using copper chromite hydrogenation catalyst, but preferably is carried out in two steps, a first hydrogenation being carried out using nickel catalyst followed by a second hydrogenation with copper chromite catalyst. As a result, cleaner separation of the components of the high-boiling composition is effected and more effective use of the hydrogenation catalyst is obtained, a substantially larger amount of product being hydrogenated before it is necessary to regenerate the catalyst. These results are not obtainable by direct hydrogenation of the Oxo still bottoms. The preliminary distillation to remove Oxo catalyst is essential.

Nickel catalyst useful in the initial hydrogenation of the distillate from the Oxo bottoms, includes well-known nickel hydrogenation catalyst such as Raney nickel and reduced nickel catalyst containing about 58 percent nickel on kieselguhr or other inert support, having a ratio of reduced nickel to total nickel of from about 0.60 to 0.65. Hydrogenation with such nickel catalyst can be carried out at temperatures of from about 100 to 200° C., pressures of from about 50 to 5,000 p.s.i. and feed rates of about 1 to 7 gallons per minute per 2,000 pounds of catalyst.

Copper chromite hydrogenation catalyst which can be used alone for the hydrogenation of the distillate from the Oxo bottoms, or in the secondary hydrogenation step following hydrogenation with nickel catalyst, is to be understood as including either well-known copper chromite catalyst or promoted copper chromite catalyst such as barium, calcium, strontium and magnesium promoted copper chromite catalyst. A very useful promoted copper chromite catalyst is barium-promoted copper chromium oxide type catalyst for example, containing copper corresponding to about 30 to 80 percent particularly 30 to 40 percent copper oxide, chromium corresponding to about 15 to 50 percent particularly 40 to 50 percent chromium oxide, and barium corresponding to about 0 to 15 percent particularly 10 percent barium oxide, the remainder including binder such as silicate.

Hydrogenation with copper chromite catalyst such as barium promoted copper chromite catalyst can be carried out at temperatures of from about 150 to 300° C., pressures from about 1,000 to 10,000 p.s.i. and at feed rates of from about 4 to 20 pounds per pound catalyst per day. The hydrogenation with copper chromite catalyst is preferably carried out at about 230 to 255° C., substantially higher temperatures tending to affect hydrogenolysis and the lower temperatures tending to lower the rate of ester reduction. Since the feed to the reduction zone contains substantial amounts of alcohols, external cooling is usually not necessary once reduction has commenced. The feed rate to the hydrogenator can be adjusted so that the ester content of the effluent is between about 0.5 to 1.2 percent. As the catalyst loses activity, the product can be recycled and the recycle stream increased until the capacity of the hydrogenation catalyst reaches an intolerable capacity. When the ester content reaches about 1 percent, the catalyst should be regenerated. Control of the hydrogenation may be effected by maintaining an ester content below 1 percent calculated as isobutyl isobutyrate, aldehyde at 0.15 percent calculated as butyl aldehyde, unsaturation at 0.2–0.3 percent calculated as 2-ethylhexenal, and acid content below 0.03 percent calculated as isobutyric acid.

When the hydrogenation of the distillate from the Oxo bottoms is carried out according to the processes of our invention, it is possible to economically hydrogenate at least 1,000 pounds of the distillate per pound of catalyst whereas only about 50 to 75 pounds of the initial Oxo bottoms per pound catalyst can be hydrogenated before the catalyst must be regenerated.

The distillation of the Oxo bottoms prior to hydrogenation can be carried out by means of vacuum distillation in a conventional stripping column operating for example, at a base temperature of about 160 to 286° C. and a take-off temperature of about 50 to 180° C. and about 0.2 to 150 mm. pressure for a column having 10 plates.

Figure 2:
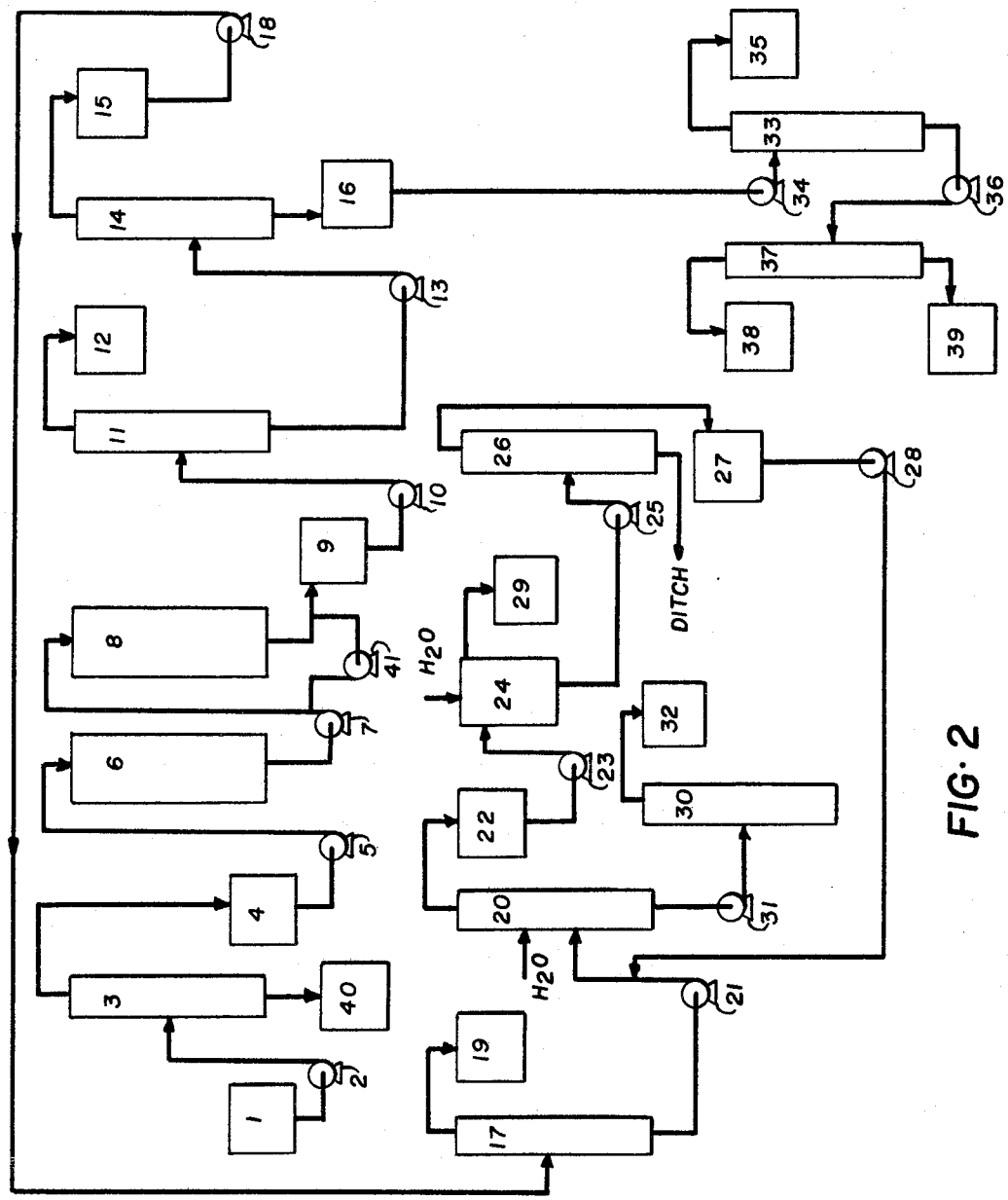

The processes of our invention can be understood by reference to FIGURES 1 and 2 of the accompanying drawings which are flow diagrams of representative processes of the invention.

As shown in FIG. 1, the high-boilers (the still bottoms obtained from a propylene feed Oxo process) are vacuum flashed and the distillate collected overhead passed to the primary hydrogenator, thence to the secondary hydrogenator where the hydrogenation is completed. Thereafter the hydrogenated product is distilled for the removal overhead of low boilers including lower alcohols and ethers boiling below 107° C. The resulting still bottoms are fed to the butanol stripper and the distillate containing butanols and butyl ethers is passed to the butanol separator to remove isobutanol as overhead product. The bottoms from the butanol separator are then treated with water and distilled by azeotropic or extractive distillation to obtain overhead water, butyl ethers and some butanol, butanol of commercial grade being obtained at the base of the column. As shown in the flow diagram, the bottoms from the butanol stripper are then fed to a vacuum stripper operating under vacuum or at atmospheric pressure to separate the $C_6$ and $C_7$ alcohols. The base is then distilled for removal of $C_8$ alcohols overhead, the bottoms obtained being useful as flotation agents or plasticizers for synthetic polymers.

FIG. 2 of the drawing illustrates a preferred embodiment of our invention wherein as shown the high-boilers (the bottoms from a propylene fed Oxo process) from tank 1 are moved by means of pump 2 to flash distillation column 3. Here 90 percent of the organic material is taken overhead to storage tank 4. The flash distillation column is run under 29 inches vacuum. The top temperature is 110–112° C., and the base is maintained at 210–220° C. The base of column 3 is drained to tank 40. From storage tank 4 by means of pump 5, the organic material is fed into the top of prehydrogenation reactor 6. This reactor is packed with nickel catalyst. The reactor is maintained at about 150–170° C. and 200 p.s.i. hydrogen. From the primary hydrogenation reactor, the organic material is fed into copper chromite reactor 8 by means of pump 7. Copper chromite reactor 8 is kept between 235–250° C. and a hydrogen pressure of 5,000–6,000 p.s.i. By means of pump 41, the reduced material may be recirculated as needed. The reduced material is collected in tank 9.

By means of pump 10, the reduced feed is fed into drying column 11. Here the organic stream is dried, and the low boilers as well as some ethers are removed into tank 12. This drying column is an 80-plate column operated at a base temperature of 125–130° C. and a top temperature of 102° C. From drying column 11 by means of pump 13, the dried organic material is fed into distillation column 14 where the butanols are stripped out. This is a 98-plate column operated at a base temperature of 140° C. and a take-off temperature of 112° C. The butanols are collected in tank 15, and the base goes into tank 16. The butanols from tank 15 are fed into column 17 by means of pump 18. This is a 100-plate column operated at a take-off temperature of 107° C. and a base temperature of 120° C. The good isobutanol is collected in tank 19. From column 17 the n-butanol is fed to azeotrope column 20 by means of pump 21. Water is also fed into column 20. This is a 98-plate column with a take-off temperature of 94° C. and a base temperature of 120° C. The take-off from column 20 contains di-n-butyl ether, n-butanol, and water and is collected in tank 22. From tank 22 the distillate is pumped by means of pump 23 to wash tank 24 where the n-butanol is washed away from the ether. The water layer from tank 24 is flashed through packed column 26 to remove the n-butanol. From tank 27 the n-butanol is fed back to column 20 by means of pump 28. The ethers are collected in tank 29. The base from column 20 is pumped to a 10-plate packed column, column 30, by means of pump 31. The n-butanol is collected in tank 32.

The organic material from tank 16 is pumped into column 33. This is a 55-plate column operated at a base temperature of 198–200° C. at atmospheric pressure. The top is maintained at 150–152° C. The $C_6$–$C_7$ alcohols are collected in tank 35. The base product of column 33 is pumped by means of pump 36 into column 37, where the $C_8$ alcohols are collected in tank 38. This 55-plate column is operated at a base temperature of 202–204° C. at atmospheric pressure and a top temperature of 170–172° C. The high boiling base product from column 37 is collected in tank 39.

In a similar manner the products of other Oxo processes such as those using $C_2$ to $C_6$ olefins can be distilled to remove the main aldehydic product and resulting high-boilers distilled so as to remove traces of catalyst, followed by hydrogenating the distillate and distilling to progressively remove the lower alcohols and ethers and at the appropriate stage employing azeotropic or extractive distillation for the separation of higher boiling water insoluble product such as ethers.

The invention has been described in detail with particular reference to preferred embodiments thereof, but it will be understood that variations and modifications can be affected within the spirit and scope of the invention as described hereinabove and as defined in the appended claims.

What we claim is:

1. In the recovery of oxygenated materials from Oxo aldehyde bottoms from the hydroformylation of olefins containing from 2 to 6 carbon atoms; the steps of vacuum distilling the bottoms which remain after the main aldehyde product has been separated to obtain an overhead distillate comprising about 80–95% of the distilland and hydrogenating the distillate with a copper-chromite catalyst at temperatures of from about 150° to about 300° C. and pressures from about 1000 to about 10,000 p.s.i. to convert the oxygenated materials to be mixture containing alcohols.

2. In the recovery of oxygenated materials from Oxo aldehyde bottoms from the hydroformylation of olefins containing from two to six carbon atoms; the steps of vacuum distilling the bottoms which remain after the main aldehyde product has been separated to obtain an overhead distillate comprising from about 80–95 percent of the distilland and hydrogenating the distillate with nickel catalyst at temperatures of from about 100° to about 200°

C. and pressures of from about 50 to about 5000 p.s.i. and then with copper-chromite catalyst at temperatures from about 150° to about 300° C. and pressures from about 1000 to about 10,000 p.s.i. to convert the oxygenated materials to a mixture containing alcohols.

3. The process of claim 1 wherein the olefins comprise propylene and the mixture resulting from the hydrogenation step is distilled to remove overhead, products boiling below 107° C., distilling the resulting still bottoms to obtain a distillate containing butanols and butyl ethers, distilling isobutanol from the distillate, treating the resulting still bottoms with water and azeotropically distilling butyl ethers therefrom.

4. The process of claim 1 wherein the olefins comprise propylene and the mixture resulting from the hydrogenation step is distilled to remove overhead, products boiling below 107° C., distilling the resulting still bottoms to obtain a distillate containing butanols and butyl ethers, distilling isobutanol from the distillate, treating the resulting still bottoms with water and azeotropically distilling butyl ethers therefrom, and distilling the still bottoms from the first butanol distillation containing $C_6$ to $C_8$ alcohols to separate the $C_6$ and $C_7$ alcohols from the $C_8$ alcohols.

5. The process of claim 2 wherein the olefins comprise propylene and the mixture resulting from the second hydrogenation step is distilled to remove overhead, products boiling below 107° C., distilling the resulting still bottoms to obtain a distillate containing butanols and butyl ethers, distilling isobutanol from the distillate, treating the resulting still bottoms with water and azeotropically distilling butyl ethers therefrom.

6. In the recovery of oxygenated materials from Oxo aldehyde bottoms from the hydroformylation of olefins containing from two to six carbon atoms; the steps of vacuum distilling the bottom which remain after the main aldehyde product has been separated to obtain an overhead distillate comprising from 80 to 95 percent of the distilland, hydrogenating the distillate with nickel catalyst at a temperature of from about 100° to about 200° C. and a pressure of from about 50 to about 5000 p.s.i., then hydrogenating the distillate with copper-chromite catalyst at temperatures from about 150° to about 300° C. and a pressure of from 1000 to 10,000 p.s.i., to convert the oxygenated materials to a mixture containing alcohols.

7. The process of claim 1 wherein the olefin feed to the hydroformylation process comprises propylene.

8. The process of claim 6 wherein the olefin feed to the hydroformylation process comprises propylene.

References Cited

UNITED STATES PATENTS

| | | | |
|---|---|---|---|
| 2,595,096 | 4/1952 | Parker | 260—632 |
| 2,671,119 | 3/1954 | Mertzweiller | 260—638 |
| 2,778,859 | 1/1957 | Johnson et al. | 260—638 |
| 2,793,236 | 5/1957 | Habeshaw et al. | 260—638 |
| 2,894,990 | 7/1959 | Wennerberg et al. | 260—604 |
| 2,991,232 | 7/1961 | Lamb et al. | |
| 3,118,954 | 1/1964 | Robbins et al. | 260—638 |
| 3,247,260 | 4/1966 | Porter et al. | 260—632 |
| 2,638,487 | 5/1953 | Russum et al. | 260—638 |
| 2,811,567 | 3/1957 | Mason | 260—638 |

OTHER REFERENCES

Hatch, "Higher Oxo Alcohols," 1957, p. 21–26.

LEON ZITVER, Primary Examiner

JOSEPH E. EVANS, Assistant Examiner

U.S. Cl. X.R.

203—84; 260—616